United States Patent
Jackson et al.

(10) Patent No.: US 10,529,358 B2
(45) Date of Patent: Jan. 7, 2020

(54) METHOD AND SYSTEM FOR REDUCING BACKGROUND SOUNDS IN A NOISY ENVIRONMENT

(71) Applicant: Shmuel Ur, Shorashim (IL)

(72) Inventors: Tim Jackson, London (GB); Shmuel Ur, Shorashim (IL)

(*) Notice: Subject to any disclaimer, the term of this patent is extended or adjusted under 35 U.S.C. 154(b) by 51 days.

(21) Appl. No.: 15/903,201

(22) Filed: Feb. 23, 2018

(65) Prior Publication Data

US 2018/0182414 A1      Jun. 28, 2018

Related U.S. Application Data

(62) Division of application No. 15/359,802, filed on Nov. 23, 2016, now abandoned.

(60) Provisional application No. 62/260,192, filed on Nov. 25, 2015.

(51) Int. Cl.
| | |
|---|---|
| *G10L 15/20* | (2006.01) |
| *G10L 25/72* | (2013.01) |
| *G10K 11/178* | (2006.01) |
| *H04R 1/10* | (2006.01) |
| *G10L 21/0208* | (2013.01) |

(52) U.S. Cl.
CPC ............ *G10L 25/72* (2013.01); *G10K 11/178* (2013.01); *G10K 11/17823* (2018.01); *G10K 11/17873* (2018.01); *G10L 15/20* (2013.01); *H04R 1/1083* (2013.01); *G10K 2210/1081* (2013.01); *G10L 2021/02087* (2013.01); *H04R 2410/05* (2013.01); *H04R 2460/01* (2013.01)

(58) Field of Classification Search
CPC combination set(s) only.
See application file for complete search history.

(56) References Cited

U.S. PATENT DOCUMENTS

| | | | |
|---|---|---|---|
| 6,876,966 B1* | 4/2005 | Deng | G06K 9/6256 704/233 |
| 2010/0172510 A1* | 7/2010 | Juvonen | G10K 11/178 381/71.6 |

OTHER PUBLICATIONS

Wang, A; The Shazam Music Recognition Service; Communications of the ACM; vol. 49, Issue No. 8, pp. 44-48. (Year: 2006).*

* cited by examiner

*Primary Examiner* — Abul K Azad

(57) ABSTRACT

A method for reducing noise to a user to enable a conversation-of-interest to be heard, the noise originating from a noise source, the method comprising the steps of: operating at least one first device located at a first distance from the noise source, the user having noise-cancellation earphones connected to a second mobile device, the second mobile device located at a second distance from the noise source, the first distance less than the second distance; prehearing noise from the noise source using the at least one first device; analyzing the preheard noise to yield a respective analyzed noise signal; and processing the respective analyzed noise signal to effect noise cancellation for the noise-cancellation earphones.

3 Claims, 4 Drawing Sheets

METHOD AND SYSTEM FOR REDUCING BACKGROUND SOUNDS IN A NOISY ENVIRONMENT

The present application claims priority from U.S. Provisional Application No. 62/260,192, filed 25 Nov. 2015, whose disclosure is incorporated herein by reference.

FIELD OF THE INVENTION AND BACKGROUND

The current invention relates to acoustic signal processing in general, and specifically to a method and system for silencing music and other background sounds in a noisy environment.

In the specification and claims which follow below, the term "noisy environment" is intended to have equivalent meaning to "noisy room", "noisy surroundings", and/or "noising background". Examples of noisy surroundings include, but are not limited to: restaurants, public places, and wedding halls.

In the specification and claim which follow below, the term "earpiece" is intended to have the same meaning of words such as, but not limited to: earphone, earphones, earbud, and hearing aid. The meaning of "noise" in the specification and claims which follow below is intended to mean any spurious sound, either in acoustic or electronic form, the spurious sound such as but not limited to: music; environmental sound; and undesirable conversation.

The "cocktail party effect" is the phenomenon of being able to focus one's auditory attention on a particular stimulus while filtering out a range of other stimuli, much the same way that a partygoer can focus on a single conversation in a noisy room. This effect is what allows most people to "tune into" a single voice and "tune out" all others. It may also describe a similar phenomenon that occurs when one may immediately detect words of importance originating from unattended stimuli, for instance hearing one's name in another conversation.

Most people can carry on conversations, even in a noisy environment, i.e. the "cocktail party effect". Noisy surroundings are common. For example, many restaurants, halls, and large public places play music while guests attempt to converse with one another.

However, hearing loss or impairment, especially associated with age-related hearing loss, makes it difficult to hear/discern conversations in a noisy environment. This difficulty impacts the social life of those who cannot converse effectively in noisy surroundings. Hearing aids cannot typically correct this problem, as the issue is not to amplify the conversation sound but rather to distinguish the conversation-of-interest from other noise in the surroundings. One way to deal with the problem is as described below.

Active noise control (ANC), also known as noise cancellation, or active noise reduction (ANR) are methods for reducing unwanted sound by the addition of a sound, the additional sound specifically designed to cancel the unwanted (first) sound. An early example of a prior art publication in this field, and which is incorporated by reference, is that in which Paul Leug, Kirchstrasse, in German Patent Application 714,582 describe how sound oscillations, which are to be silenced, are taken in by a receiver and reproduced by a reproducing apparatus in the form of sounds having an opposite phase.

Reference is currently made to FIG. 1, which is a schematic representation of a prior art principle of ANC/ARC 5, showing a noise signal 6, an anti-noise signal 7, and a resultant sound signal 9. As is shown in the figure, anti-noise signal 7 is combined with noise signal 6 to yield the resultant sound signal, which has attenuated noise and/or an overall attenuated signal.

In general, active noise cancelation is a complicated problem to address; however cancelling noise in a specific location (such as in or very close to the human ear) is well known. One example of prior art developed to cancel a specific sound from the surroundings, within an ear, is the "Here One" product, by Doppler Labs Inc., 1958 South 950 East Provo, Utah 84606, USA, whose disclosure is incorporated herein by reference.

Reiterating, the issue is not to compensate for hearing loss, but to reduce background sounds, such as described by Jorgensen et al. in US patent application publication 20090041260, whose disclosure is incorporated herein by reference. Jorgensen describes a hearing device system comprising at least one hearing aid circuitry and at least one active noise cancellation unit, the at least one hearing aid circuitry comprises at least one input transducer adapted to convert a first audio signal to an electric audio signal; a signal processor connected to the at least one input transducer and adapted to process said electric audio signal by at least partially correcting for the hearing loss of a user; an output transducer adapted to generate from at least said processed electric audio signal a sound pressure in an ear canal of the user, whereby the generated sound pressure is at least partially corrected for the hearing loss of the user; the at least one active noise cancellation unit being adapted to provide an active noise cancellation signal adapted to perform active noise cancellation of an acoustical signal entering the ear canal in addition to said generated sound pressure, wherein the hearing device system further comprises a combiner unit adapted to combine the processed electric audio signal with the active noise cancellation signal, to obtain a combined signal and to provide the combined signal to the output transducer.

In U.S. patent application Ser. No. 13/559,299, whose disclosure is incorporated herein by reference, Christoph describes an active noise reduction system, which includes an earphone with a cup-like housing, and a transmitting transducer, which converts electrical signals into acoustical signals and is arranged at an aperture of the housing. A receiving transducer converts acoustical signals into electrical signals, and is arranged proximate the transmitting transducer. A duct includes an end acoustically coupled to the receiving transducer, another end located proximate the transmitting transducer. An acoustical path extends from the transmitting transducer to a listener's ear, and has a first transfer characteristic. Another acoustical path extends from the transmitting transducer through the duct to the receiving transducer, and has a second transfer characteristic. A control unit generates a noise reducing electrical signal that is supplied to the transmitting transducer. This signal is derived from the receiving-transducer signal and filtered with a third transfer characteristic.

Andrea et al., in U.S. Pat. No. 6,061,456, whose disclosure is incorporated herein by reference, describe a transducer for use in a noise cancellation apparatus for reducing background noise, including a housing having first microphone means for receiving a first acoustic sound composed of speech originating from an operator operating the apparatus and background noise, and for converting the first acoustic sound to a first signal, and second microphone means arranged at a predetermined angle $\varphi$ in close proximity with respect to the first microphone means for receiving a second acoustic sound composed of substantially the background noise and for converting the second acoustic sound to a second signal. The first and second microphones are connected to a differential amplifier means of the noise cancellation apparatus so as to obtain a signal representing substantially speech. The amplifier means is for receiving acoustic sounds from each microphone and has a first terminal and a second terminal, wherein the second terminal is grounded. The transducer further includes a transistor means for receiving and amplifying an AC signal representative of the audio input from each microphone; and means for filtering the amplified AC signal from the DC signal, so that the DC signal powers the amplifier means. Also disclosed is a method for calibrating an active noise reduction apparatus including a housing having a speaker to produce an acoustic anti-noise signal in the housing, a microphone to detect an external noise signal, and an amplitude adjustment means to calibrate the acoustic anti-noise signal to create a quiet zone in the housing for operation with an independent electrical assembly, wherein the apparatus is calibrated separately from the electrical assembly. The method includes the steps of: inputting the external noise signal received by the microphone to produce an anti-noise signal; transmitting to the speaker the anti-noise signal having an equal gain and opposite phase response to the external noise signal detected by the microphone; and balancing the gain and phase response of the anti-noise signal by the amplitude adjustment means located in the noise reduction apparatus to match the gain and phase response of the external noise signal to yield a theoretical zero hi the quiet zone.

A strong disadvantage of the prior art is that a conversation-of-interest is generally cancelled/attenuated/removed, along with environmental noise.

There is therefore a need to more effectively cancel and/or clean a noisy background and with high selectivity, while substantially not-attenuating at least one conversation-of-interest in the environment to enable the user to more easily hear/discern the conversation.

SUMMARY OF INVENTION

According to the teachings of the current invention, there is provided a method for reducing noise to a user to enable a conversation-of-interest to be heard, the noise originating from a noise source, the method comprising the steps of: operating at least one first device located at a first distance from the noise source, the user having noise-cancellation earphones connected to a second mobile device, the second mobile device located at a second distance from the noise source, the first distance less than the second distance; prehearing noise from the noise source using the at least one first device; analyzing the preheard noise to yield a respective analyzed noise signal; and processing the respective analyzed noise signal to effect noise cancellation for the noise-cancellation earphones. Preferably, the at least first device is chosen from the list including: a mobile device; and a sound sensor having electronic communication capability. Most preferably, the second device is a mobile device. Typically, the conversation-of-interest is heard by the user, chosen from the list including: transferred by the user's mobile device to the noise cancellation earphones; directly, without the use of noise cancellation earphones, and directly and transferred by the user's mobile device to the noise cancellation earphones.

According to the teachings of the current invention, there is further provided a method for reducing noise to a user to enable a conversation-of-interest to be heard, the noise originating from an acoustical and a non-acoustical source, the method comprising the steps of: operating a mobile device, the user having noise-cancellation earphones connected to the mobile device; prehearing the noise using the mobile device; analyzing the preheard noise to yield an analyzed noise signal; and processing the analyzed noise signal to effect noise cancellation for the noise-cancellation earphones. Preferably, prehearing the noise is performed non-acoustically from the non-acoustical source. Most preferably, the noise is preheard electronically, with timing of prehearing chosen from the list including: substantially simultaneously as the noise originates from the acoustical source; and before the noise originates from the acoustical source. Typically, the mobile device is a user-worn integrated device having the mobile device and the noise cancellation earphones.

According to the teachings of the current invention, there is further provided a method for reducing noise to a user to enable a conversation-of-interest to be heard, the noise originating from an acoustical source, the method comprising the steps of: operating a mobile device, the user having noise-cancellation earphones connected to the mobile device; sampling the noise using the mobile device; analyzing the preheard noise to yield an analyzed noise signal; and processing the analyzed noise signal to effect noise cancellation for the noise-cancellation earphones. Preferably, the noise is sampled from the acoustical source, the sample is compared to a database having noise recordings, and thereby identifying and retrieving an entire recording matching the noise, the entire recording subsequently used for noise cancellation.

According to the teachings of the current invention, there is further provided a system for reducing noise to a user to enable a conversation-of-interest to be heard, the noise originating from a noise source, the system comprising: at least one first device located at a first distance from the noise source; the user having noise-cancellation earphones configured to be connected to a second mobile device, the second mobile device located at a second distance from the noise source, the first distance less than the second distance; the at least one first device configured to prehear noise from the noise source; the preheard noise being analyzed to yield a respective analyzed noise signal; and the noise-cancellation earphones configured to effect noise cancellation, subsequent to processing of the respective analyzed noise signal. Preferably, the at least first device is chosen from the list including: a mobile device; and a sound sensor having electronic communication capability. Most preferably, the second device is a mobile device. Typically, the conversation-of-interest is heard by the user, chosen from the list including: transferred by the user's mobile device to the noise cancellation earphones; directly, without the use of noise cancellation earphones.

According to the teachings of the current invention, there is further provided a system for reducing noise to a user to enable a conversation-of-interest to be heard, the noise originating from an acoustical and a non-acoustical source, the system comprising: a mobile device configured to be connected to noise-cancellation earphones of the user; the mobile device further configured to prehear the noise; the preheard noise being analyzed to yield an analyzed noise signal; and the noise-cancellation earphones configured to effect noise cancellation, subsequent to processing of the analyzed noise signal. Preferably, the noise is preheard non-acoustically from the non-acoustical source. Most preferably, the noise is preheard electronically, with a timing of prehearing chosen from the list including: substantially simultaneously as the noise originates from the acoustical source; and before the noise originates from the acoustical source.

According to the teachings of the current invention, there is further provided a system for reducing noise to a user to enable a conversation-of-interest to be heard, the noise originating from an acoustical source, the system comprising: a mobile device configured to be connected to noise-cancellation earphones of the user; the mobile device further configured to sample the noise; the preheard noise being analyzed to yield an analyzed noise signal; and the noise-cancellation earphones configured to effect noise cancellation, subsequent to processing of the analyzed noise signal. Preferably, the noise is sampled from the acoustical source, the sample compared to a database having noise recordings, and thereby identifying and retrieving an entire recording matching the noise, the entire recording subsequently used for noise cancellation.

LIST OF FIGURES

The invention is herein described, by way of example only, with reference to the accompanying drawings, wherein.

Figure 3:
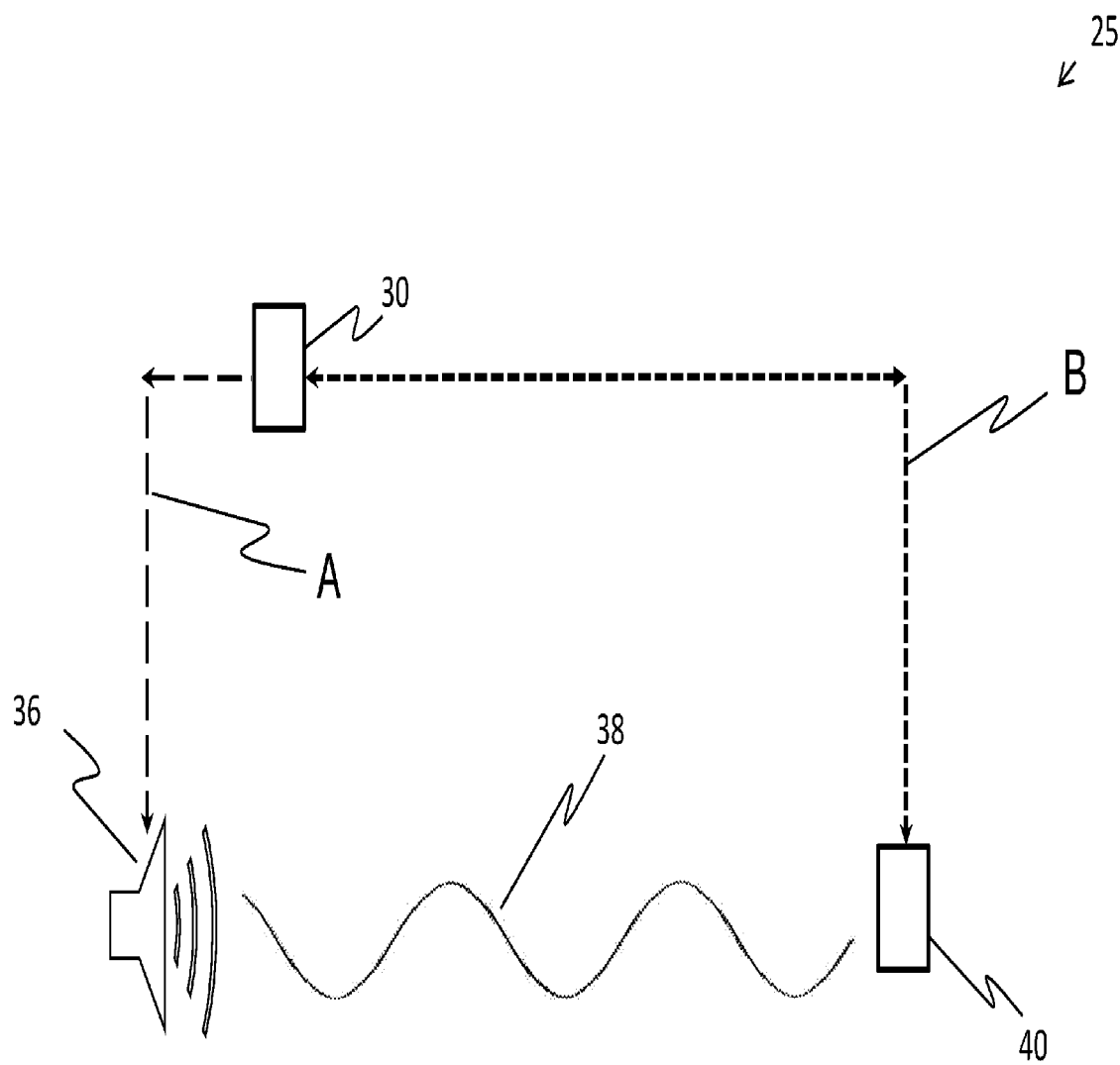
Figure 4:
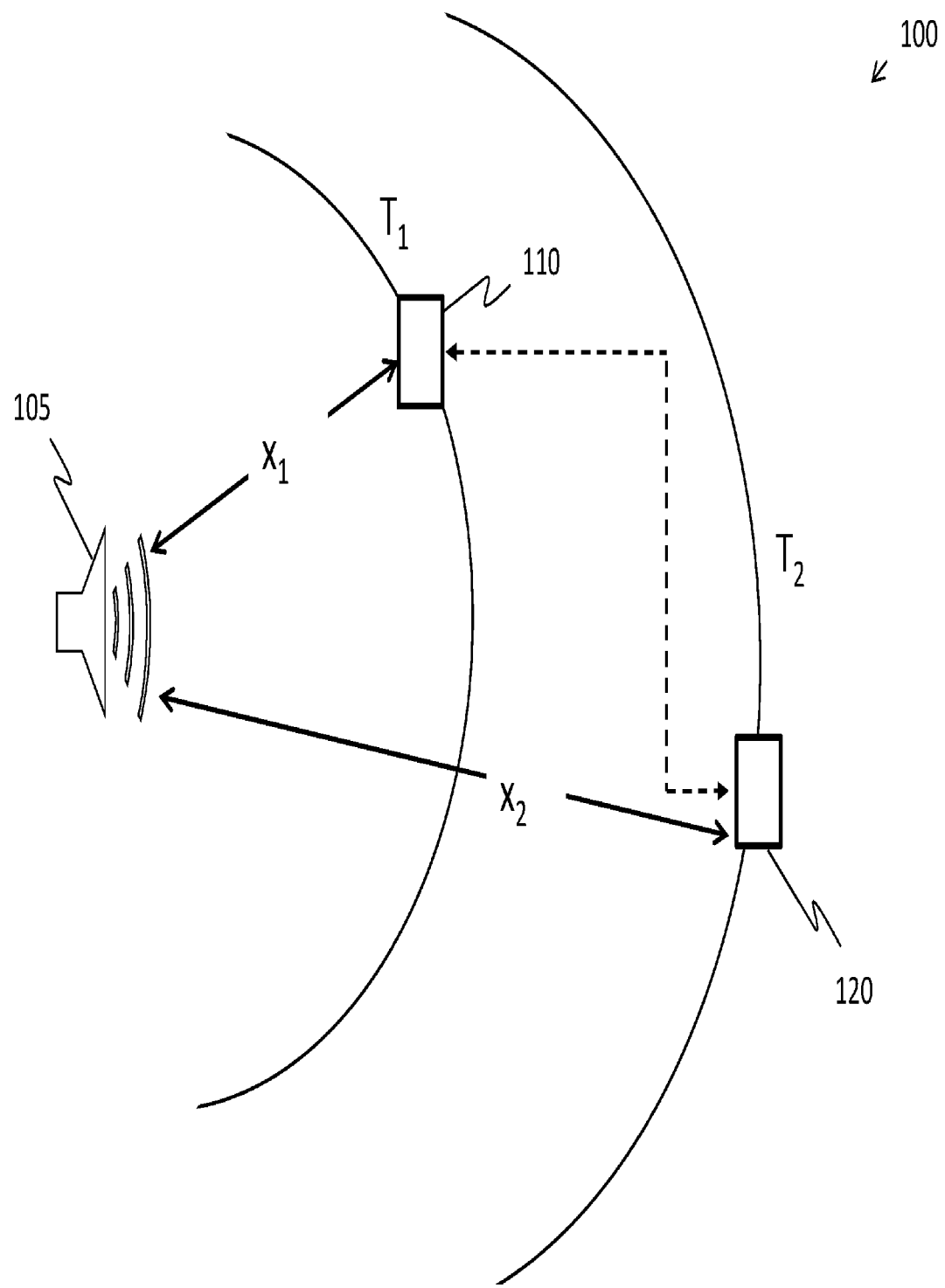

FIG. 3 is a schematic representation of a noise cancellation system having an electronic noise source, an acoustical noise source, emitting acoustical noise, and a mobile device, in accordance with embodiments of the current invention; and FIG. 4 is a schematic representation of a noise cancellation system having a noise source and two exemplary mobile devices, in accordance with embodiments of the current invention.

DETAILED DESCRIPTION

Embodiments of the present invention relate to acoustic signal processing in general, and specifically to a method and system for silencing music and other background sounds in a noisy environment.

In one embodiment, a user is located in a noisy environment in which music is playing from loud speakers. The user wants to hear/discern a conversation-of-interest, but cannot do so because of the music. A complete solution to the problem is to directly (and substantially only) cancel the music.

Figure 1:
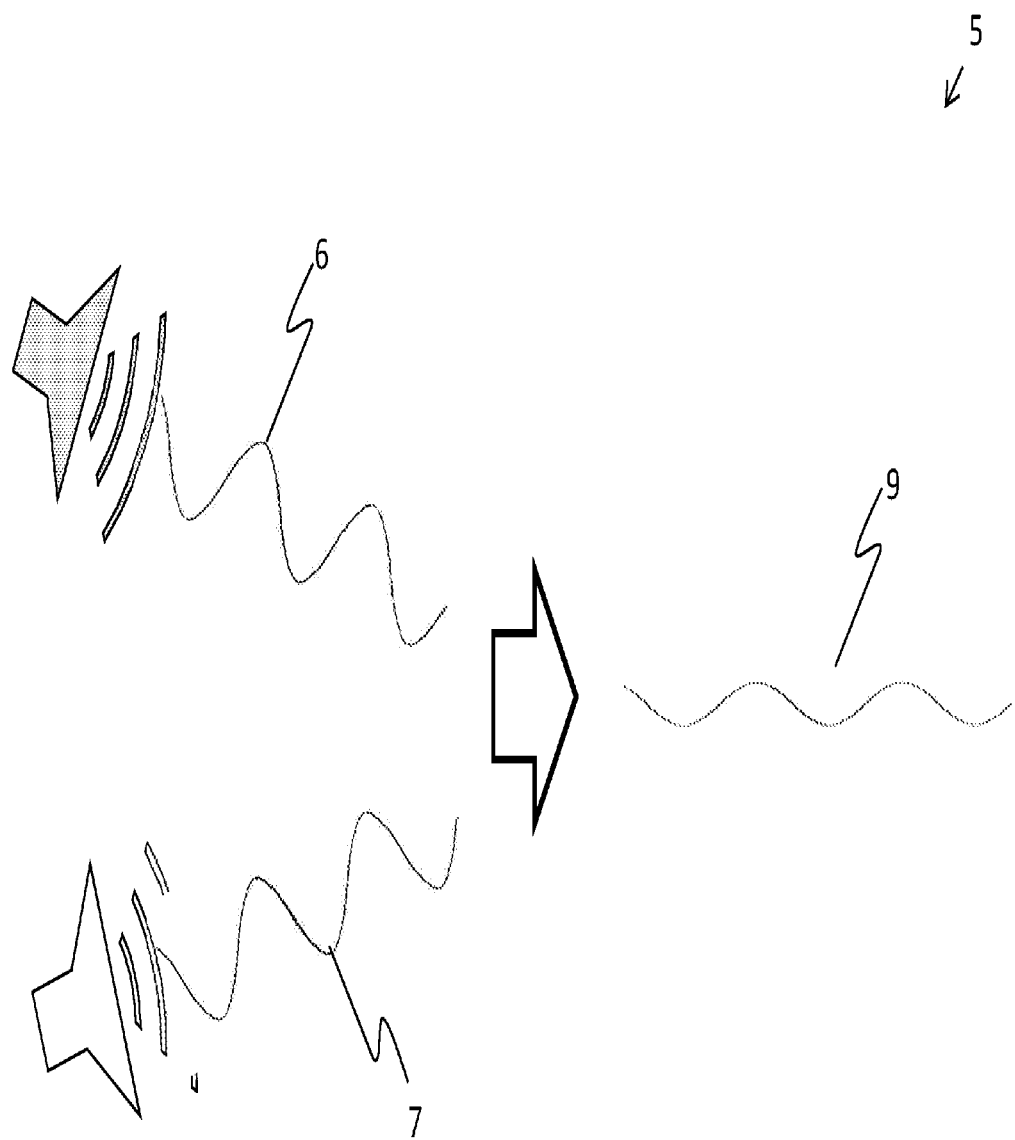
FIG. 1 is a schematic representation of a prior art principle of ANC/ARC, showing a noise source/signal, an anti-noise source/signal, and a resultant sound signal.
Figure 2:
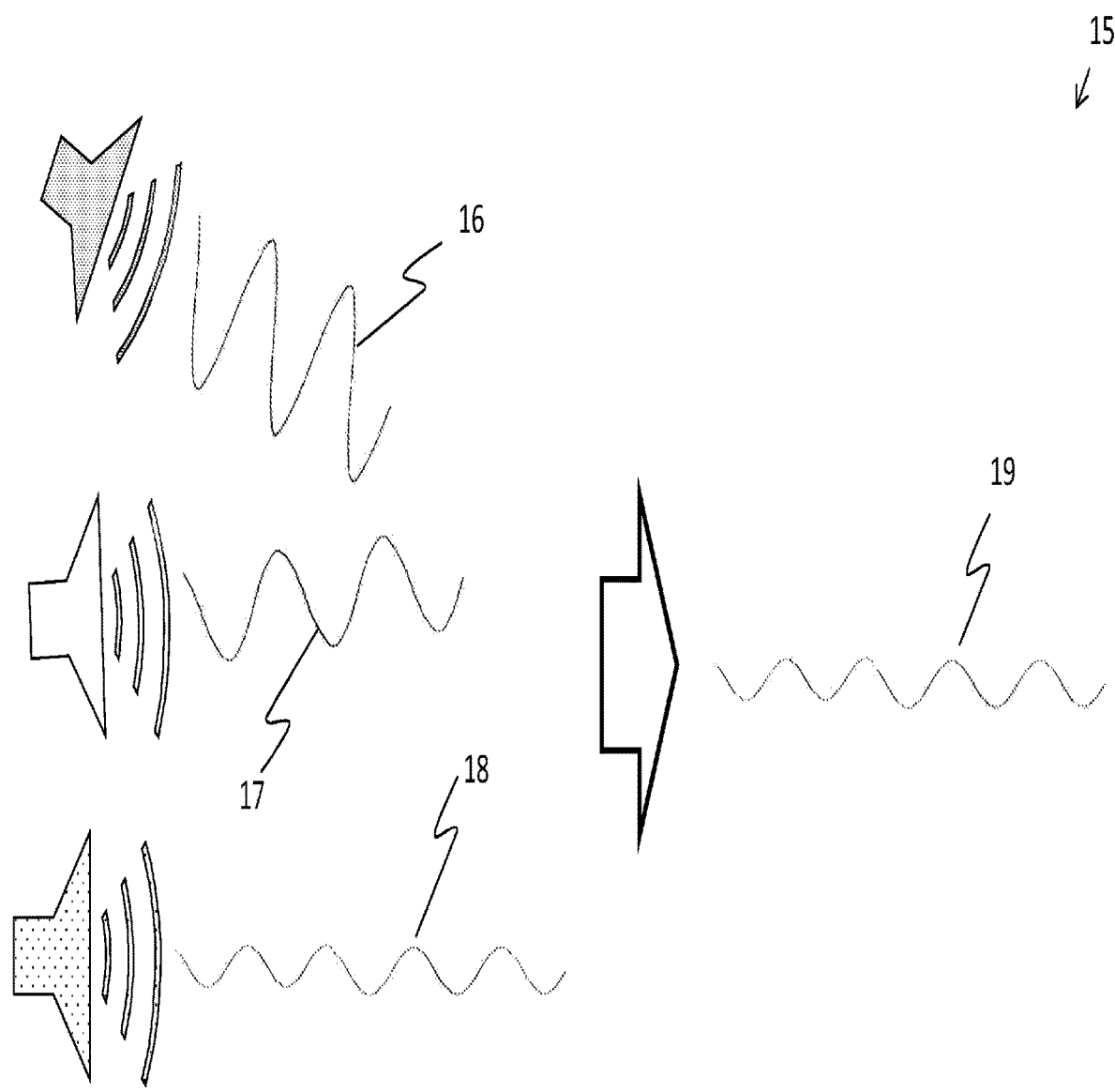
FIG. 2 is a schematic representation of an ANC/ARC system similar to that shown in FIG. 1, but having direct cancellation of a noise signal by an anti-noise source/signal, yielding a resultant sound signal which substantially represents a conversation signal, in accordance with an embodiments of the current invention.

Reference is made to FIG. 2, which is a schematic representation of an ANC/ARC system 15, similar to that shown in FIG. 1, but having direct cancellation of a noise signal 16 by an anti-noise source/signal 17, yielding a resultant sound signal 19 which substantially represents a conversation signal 18, in accordance with an embodiments of the current invention. In the current figure, system 15 takes advantage of knowing in advance what the noise signal is to be able to more selectively and more completely cancel the noise signal, using one or more of the abovementioned noise cancellation techniques, to allow the resultant sound signal (ie the sound signal which is heard by the user) to be essentially/substantially the conversation signal 18 itself. Conversation signal 18 is effectively the conversation-of-interest described above.

In the specification and in the claims which follow, the term "conversation-of-interest" is intended to have the meaning regarding conversation, as described above; however the term "conversation-of-interest" is also to be understood more widely as any sound signal of interest—as opposed to spurious "noise".

The following discussion is an exemplary case of an embodiment of the current invention, where noise signal 16 is music, such as background music (which frequently is intrusive even though it is intended as background) played in public places, such as in restaurants and/or other meeting places.

Embodiments of the current invention include a method for identifying the music, coupled with active noise cancelation to enable hearing a conversation-of-interest in noisy surroundings. As opposed to the prior art, embodiments of the current invention do not involve prediction or anticipation of the music—rather embodiments of the current invention use a deterministic approach, as described below. This distinction allows for more complete active noise cancelation and also for better results in dealing with noise (i.e. music and other background sounds) which is difficult to predict in advance.

As part of embodiments of the current invention, it is understood that the user has a mobile device (such as, but not limited to: a smartphone, a tablet, an Amazon Echo, and any similar processor-based device which has at least one microphone) in communication with active noise cancelation earphones. One such configuration is found in hearing aid compatible (HAC) mobile phones, as known in the art, which contain ANC as described above.

While the mobile device and the noise cancellation earphones are described as two separate entities (albeit having communication between the two) embodiments of the current invention further include an integrated and user-worn device, such as but not limited to: multi-functional eyeglasses including the mobile device and the noise cancellation earphones; and integrated virtual reality eyewear including the mobile device and the noise cancellation earphones.

Embodiments of the current invention take advantage of knowing what noise (in the current example, background music) will be played/heard in the very near future— meaning usually a short time—from 1 to 20 milliseconds— before the noise reaches the user.

The relative locations of the source of noise versus the location of the conversation-of-interest are important with regard to embodiments of the current invention. Based on the speed of sound, the short time indicated above means that, whereas an exemplary conversation-of-interest takes place typically about 1 to 3 meters from the user, the source of noise which we wish to cancel must be located at least a few meters further away from the user. In the most general sense, embodiments of the current invention dictate that the conversation of interest is closer to the user than the noise source.

The term "prehear", as used in the specification and claims which follow, is intended to mean such knowledge of the sound in the very near future. The sound (usually "noise", as defined above) may be preheard using acoustical and/or non-acoustical means. Four methods/options to prehear the background sound (noise) are presented below.

Option 1

A first option/method is to analyze what music is being played by using a music analysis technique such as that by Shazam Entertainment Limited, 26-28 Hammersmith Grove, London W6 7HA, United Kingdom, whose disclosure is incorporated herein by reference. This method entails sampling the music and sending the recorded sample to the cloud (using the shortest possible transmission time) and then analyzing the recorded sample, as known in the art. Following analysis, a sound file for the entire recording is retrieved—typically a complete song, which is then used by a noise cancelation device to cancel the noise (music). Retrieval/transfer of the file may be done as a complete file or in streaming fashion.

Alternatively or optionally, the "Shazam" technique described could take place very close to or integrated with the noise cancellation mobile device by, for example, placing a large music database on the device and performing the analysis and look up locally on the mobile device. Furthermore, any recorded noise which is likely to be repeated in the future may be added to the database.

Stated differently, once identification of a recording has taken place, a noise cancellation device cancels the played music because the noise cancellation device has essentially accessed the sound signal in advance. Learning the exact timing is straightforward, as is described in more detail below.

It should be noted that sampling/listening to the music, as noted above, is virtually identical to the definition of "prehearing" hereinabove, except that in the case of Option 1, the noise signal may be heard well in advance (meaning a much longer time than "a very short time") of when the music would be played/heard.

Option 2

A second option in the example of a restaurant, entails transmitting the music (noise) (1): as it being played, (2): a short time before it played, or (3): any time before it is played using in short-distance electric communication, such as, but not limited to, Wi-Fi. In the first two cases, (1) and (2), because sound travels significantly more slowly than an electronic transmission, the transmitted signal reaches the mobile device/user before the noise, allowing the signal information to be used to prepare a noise-cancellation signal before the arrival of the noise itself. Case (3) is essentially similar to Option 1 above—meaning the music file is know well in advance and may be used for noise cancellation.

Alternatively or optionally, a restaurant speaker playing the background music may be wirelessly connected to the source of the music (noise) in the restaurant, in which case the mobile device may be wirelessly connected directly to the source—meaning the music is preheard without acoustic means.

Alternatively or optionally, the restaurant may also have the speaker configured with a slight delay, thereby allowing additional time to apply active sound cancelation. In each case, prehearing the sound is useful for subsequent application of active noise cancelation, as described hereinabove.

Reference is currently made to FIG. 3, which is a schematic representation of a noise cancellation system 25 having an electronic noise source 30, an acoustical noise source 36, emitting acoustic noise 38, and a mobile device 40, in accordance with embodiments of the current invention—and as described above in Options 1 and 2. The noise is transmitted from the electronic noise source to the acoustical noise source, along electronic communication path "A", and acoustic noise 38 is preheard by the mobile device, analyzed for ANC, and then sent onto the user having an earpiece, (not shown in the current figure).

As described in Option 1 above, electronic noise source 30 serves to transmit the noise file to mobile device 40—along electronic communication path "B"—to serve to cancel the noise.

In both Options 1 and 2, by prehearing the noise, as described above, mobile device can effectively cancel the noise.

Option 3

A third option is to prehear the sound using a sound sensor located at a distance closer to the noise source than the location of the user. The preheard noise is then forwarded for processing using electronic communication, which is significantly faster than the speed of sound—all as noted above. Assuming the preheard noise processing is fast enough, active noise cancellation may be applied. Note that the simplest variation of Option 3 is to employ a simple microphone-type sensor which picks up the noise and transmits the noise-sound signal electronically for further calculation/analysis on another device, such as the user's mobile device.

Alternatively or optionally, another way to prehear the music this way is by the user placing his mobile device closer to the source of the noise to be canceled and having the mobile device communicate with the user's sound canceling earphones. In the current option, a mobile device app is applied to allow the mobile device to prehear, calculate, and then send the noise-cancelling signal, along with the conversation-of-interest sound, to the user's earphones.

Option 4

A fourth option is to have a sharing app on a plurality of mobile devices. Reference is currently made to FIG. 4, which is a schematic representation of a noise cancellation system 100 having a noise source 105 and two exemplary mobile devices 110 and 120, in accordance with embodiments of the current invention. Mobile devices 110 and 120 are representative of a typical plurality of mobile devices. System 100 operates by having mobile devices 110 and 120 hear and identify the same noise—ie background music, in the case of the restaurant example.

Assuming mobile device 120 is the device of the user—meaning the user for whom we wish to cancel the background noise—mobile device 120 then determines which of a plurality of mobile devices in its vicinity is closer to the noise source. In the figure, it can be seen that mobile device 110 is located at a distance $x_1$ (corresponding to time $T_1$ for sound to travel), whereas mobile device 120 (the user's device) is located at a distance $x_2$ (corresponding to time $T_2$ for sound to travel). In our example, mobile device 110 is closer to noise source 105 than mobile device 120. Using the mobile device 110 to prehear the noise for mobile device 120, as described hereinabove in Option 3, affords a time advantage of $T_1$-$T_2$. The preheard noise is analyzed, either on mobile device 120 or in the cloud, and the information is used for noise cancellation, as described hereinabove. The dotted line between mobile devices 110 and 120 schematically represents either direct communication and/or communication between the devices by virtue of the cloud, as known in the art.

Embodiments of the current invention typically constrain the conversation-of-interest to be located closer to mobile device 120 than to mobile device 110. In the example above, more than one mobile device addition to mobile device 110) may be used to prehear the noise and the resultant plurality of prehearing mobile devices can be used to enhance noise reduction/cancellation, operating with user's mobile device (ie mobile device 120), as above.

Unlike option 1 or 2 for which we need either to know/identify the noise (i.e. music) or to receive it from some source, options 3 and 4 can be applied for any background noise—such as, but not limited to: construction noise, sea noise, and traffic noise. In other words, option 3 and 4 are not limited to music.

It is noted that in all of four Options described above, while noise reduction/cancellation is carried out as described hereinabove, the conversation-of-interest is transferred by the user's mobile device in parallel and played/heard by the user on his earphones. Alternatively or optionally, the conversation-of-interest is heard directly by the user without the use of earphones. Alternatively or optionally, the conversation-of-interest is played and heard by the user on his earphones and heard directly.

It will be appreciated that the above descriptions are intended only to serve as examples, and that many other embodiments are possible within the scope of the present invention as defined in the appended claims.

The invention claimed is:

1. A method for reducing noise to a user, wherein the noise originating from an acoustical source, wherein the method comprising the steps of:
   capturing, by a mobile device of the user, a combined soundwave, wherein the combined soundwave comprises a combination of a soundwave of the noise and a second soundwave;
   comparing the combined soundwave to a database having noise recordings;
   retrieving an entire recording matching the noise, wherein the entire recording comprise a future noise, wherein the future noise is expected to reach the mobile device at a later time than said retrieving;
   implementing noise cancelation on the combined soundwave using the future noise, thereby producing a produced soundwave; and
   wherein the entire recording is a recording of a music, wherein the noise is a portion of the music that is being played, wherein the future noise is a second portion of the music that has not yet been played when said retrieving is performed.

2. A computer program product for reducing noise to a user, wherein the noise originating from an acoustical source, wherein the computer program product comprising a non-transitory computer-readable medium retaining instructions, which instructions, when read by a processor, cause the processor to perform:
   obtaining, from a mobile device of the user, a combined soundwave, wherein the combined soundwave comprises a combination of a soundwave of the noise and a second soundwave;
   comparing the combined soundwave to a database having noise recordings;
   retrieving an entire recording matching the noise, wherein the entire recording comprise a future noise, wherein the future noise is expected to reach a mobile device at a later time than said retrieving;
   implementing noise cancelation on the combined soundwave using the future noise, thereby producing a produced soundwave; and
   wherein the entire recording is a recording of a music, wherein the noise is a portion of the music that is being played, wherein the future noise is a second portion of the music that has not yet been played when said retrieving is performed.

3. The computer program product of claim 2, wherein the combined soundwave is captured by a microphone of the mobile device.

* * * * *